(12) United States Patent
Uges

(10) Patent No.: US 8,100,386 B2
(45) Date of Patent: Jan. 24, 2012

(54) ENTHALPY EXCHANGER

(75) Inventor: Peter Gerard Hans Uges, Amsterdam (NL)

(73) Assignee: StatiqCooling B.V., Rijssen (NL)

( * ) Notice: Subject to any disclaimer, the term of this patent is extended or adjusted under 35 U.S.C. 154(b) by 513 days.

(21) Appl. No.: 12/301,493

(22) PCT Filed: May 21, 2007

(86) PCT No.: PCT/NL2007/050235
§ 371 (c)(1),
(2), (4) Date: May 11, 2009

(87) PCT Pub. No.: WO2007/136265
PCT Pub. Date: Nov. 29, 2007

(65) Prior Publication Data
US 2010/0012309 A1  Jan. 21, 2010

(30) Foreign Application Priority Data
May 22, 2006 (NL) ..................... 2000079

(51) Int. Cl.
B01F 3/04 (2006.01)
(52) U.S. Cl. ........... 261/153; 261/154; 62/316; 165/166
(58) Field of Classification Search .............. 261/153, 261/154, 158, 112.1; 62/304, 315, 316; 165/166, 165/170
See application file for complete search history.

(56) References Cited

U.S. PATENT DOCUMENTS

| 2,259,541 A | | 10/1941 | Ballard | |
|---|---|---|---|---|
| 4,708,832 A | * | 11/1987 | Norback | 261/153 |
| 4,758,385 A | * | 7/1988 | Acker et al. | 261/153 |
| 5,187,946 A | * | 2/1993 | Rotenberg et al. | 62/314 |
| 6,289,977 B1 | * | 9/2001 | Claudel et al. | 165/157 |
| 6,776,001 B2 | * | 8/2004 | Maisotsenko et al. | 62/315 |
| 7,269,966 B2 | * | 9/2007 | Lowenstein et al. | 62/271 |
| 2003/0033826 A1 | | 2/2003 | Moriguchi et al. | |
| 2005/0218535 A1 | * | 10/2005 | Maisotsenko et al. | 261/153 |

FOREIGN PATENT DOCUMENTS

| EP | 0 661 502 A2 | 7/1995 |
|---|---|---|
| SU | 827947 A1 | 5/1981 |
| WO | 00/11422 A1 | 3/2000 |
| WO | 2005/040693 A2 | 5/2005 |
| WO | 2005/106343 A1 | 11/2005 |

OTHER PUBLICATIONS

Patent Corporation Treaty, "International Preliminary Report on Patentability", PCT/NL2007/050235, Officer Lienhard, Dominique, Sep. 5, 2008, European Patent Office.

Dutch Patent Office, "International Search Report for International Application No. 1.236.002 NL", dated Jan. 25, 2007, Publisher: Dutch Patent Office, Published in: NL.

* cited by examiner

Primary Examiner — Charles Bushey
(74) Attorney, Agent, or Firm — DeMont & Breyer, LLC

(57) ABSTRACT

The invention relates to an enthalpy exchanger, comprising at least one enthalpy-exchanging unit, which enthalpy-exchanging unit: comprises at least one plate, along at least one contact side of which a first liquid medium and a second medium can be displaced while exchanging enthalpy, and comprises at least one hygroscopic material layer which connects to at least one contact side of the plate in contact with the first liquid medium, wherein the mutual orientation of the plate and the material layer is such that a liquid film of the first medium can form between the plate and the material layer, wherein the liquid film is in enthalpy-exchanging contact with both the plate and the material layer.

20 Claims, 3 Drawing Sheets

ENTHALPY EXCHANGER

Figure 1:
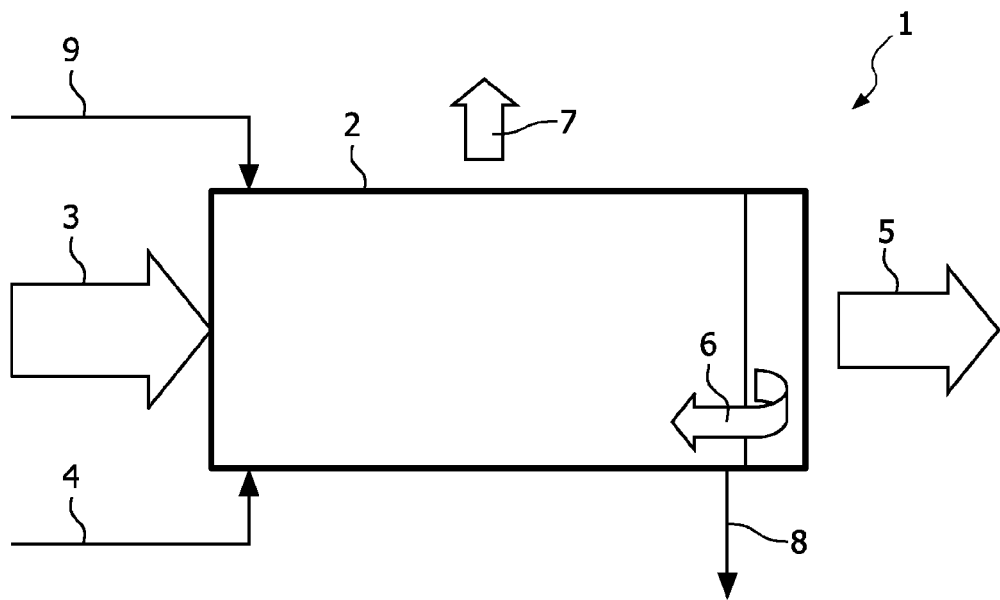

This application is the national stage entry of PCT/NL2007/050235, filed under 35 U.S.C. 371, the international application having been filed on May 21, 2007. This application further claims foreign priority under 35 U.S.C. 119 from application no. 2000079 filed in the Netherlands on May 22, 2006.

The invention relates to an enthalpy exchanger, comprising at least one enthalpy-exchanging unit, which enthalpy-exchanging unit comprises at least one plate, along at least one contact side of which a first liquid medium and a second medium can be displaced while exchanging enthalpy, and which enthalpy-exchanging unit comprises at least one hygroscopic material layer which connects to at least one contact side of the plate in contact with the first liquid medium, wherein the mutual orientation of the plate and the material layer is such that a liquid film of the first medium can form between the plate and the material layer, wherein the liquid film is in enthalpy-exchanging contact with both the plate and the material layer.

Intentional enthalpy exchange between two media has been applied for several thousand years. It was thus already known in antiquity that liquids, particularly drinks, could be kept cool in unglazed (permeable) pitchers. Through transpiration of the pitcher the liquid present on the exterior of the pitcher was evaporated, whereby heat was extracted from the pitcher and thereby from the liquid. Particularly in recent decades the techniques for cooling media, in particular airflows, have made considerable progress. A current technique for cooling airflows is to guide air for cooling directly along a moist surface. The heat required for evaporation of the water that is present is herein extracted from the airflow, whereby the temperature of this latter falls. This technique is usually also referred to as direct evaporation cooling or as wet-bulb cooling. The drawback of direct evaporation cooling is that the evaporated moisture enters the airflow, whereby the relative humidity will generally increase sharply and usually result in fungal growth on goods in the close vicinity. The above stated drawbacks can be prevented by cooling the airflow without wetting it directly. Such a technique is usually referred to as (indirect) dewpoint cooling. In dewpoint cooling the heat required for cooling the air is extracted from the airflow indirectly, i.e. via one or more separating walls of the enthalpy exchanger, without condensation herein occurring of the moisture present in the airflow. Recently developed systems based on this technique of dewpoint cooling make use of an enthalpy exchanger of the type stated in the preamble, wherein an adhesive layer is applied between the separating wall and the hygroscopic material layer in order to be able to realize a good connection of the material layer to the separating wall. To this end the adhesive layer is applied over the whole, or at least almost the whole contact side of the separating wall. A great drawback of the known enthalpy exchanger is that the adhesive layer has a strong insulating power and thereby generally impedes the enthalpy exchange considerably. The application of the adhesive layer must furthermore take place very accurately. Excess adhesive will generally be absorbed by the hygroscopic layer, which will significantly reduce the hygroscopicity of the material layer, and thereby the enthalpy-exchanging capacity of the enthalpy exchanger. Merely omitting the adhesive layer in the known enthalpy exchanger will however result in the material layer detaching from the contact side of the separating wall, whereby formation of a liquid film cannot be realized, or hardly so. It is particularly during a period that the material layer is dry that the material layer will expand and detach from the contact side of the separating wall such that a liquid film can no longer form after renewed wetting of the enthalpy exchanger, which therefore results in a significant reduction in enthalpy-exchanging capacity. The international patent application WO05106343 attempts to provide a solution to the above stated problem by applying an enthalpy exchanger in which the material layer in fact lies unattached against the separating wall, wherein the material layer is pressed against the separating wall by means of press-on strips in order to enable the material layer to connect sufficiently to the separating wall, but without therein preventing the liquid film from displacing between the separating wall and the material layer. Although this enthalpy exchanger has an improved enthalpy-exchanging capacity compared to the above discussed conventional enthalpy exchanger, in which the material layer and the separating wall are wholly adhered to each other, this enthalpy exchanger has the significant drawback that air bubbles generally occur between the separating wall and the material layer, this drastically reducing the capacity of the enthalpy exchanger. Because the material layer is generally moist, the included air will not usually be able to escape from the space enclosed by the material layer and the separating wall, whereby there will then generally be no improvement in the limited utilization of the maximum capacity of the known enthalpy exchanger.

The invention has for its object to provide an improved enthalpy exchanger with which the above stated problems can be prevented.

The invention provides for this purpose an enthalpy exchanger of the type stated in the preamble, characterized in that the material layer is attached to the plate at a plurality of point locations lying a distance from each other such that the liquid film can extend substantially unobstructed over substantially the whole contact side of the separating wall. Attaching the material layer to the plate at a plurality of point locations lying a distance from each other can prevent (an enthalpy exchange-impeding) air formation between the material layer and the plate, whereby the maximum enthalpy-exchanging capacity of the enthalpy exchanger according to the invention can be utilized permanently in the operative state. Furthermore, because the material layer is only attached at point locations to the plate, a substantially unobstructed displacement of the liquid medium can nevertheless take place between the (channel-like) space enclosed by the material layer and the plate. Through the use of point locations (where the material layer is attached to the plate) a plurality of flow channels is generally created between the point locations, via which flow channels the liquid medium can displace. Using the enthalpy exchanger according to the invention an optimum balance is thus obtained between an effective utilization of the enthalpy-exchanging capacity of the enthalpy exchanger on the one hand, while a substantially unobstructed displacement of the liquid medium remains ensured on the other. Through use of the (position-selective) point locations or attachment points the conventional pressing means can to a substantial extent be omitted, which can significantly reduce the cost price of the enthalpy exchanger according to the invention. A substantial weight-saving can moreover be realized by omitting at least some of the pressing means, this generally also being advantageous from a logistics viewpoint. At least some of the number of point locations will generally be located at different height levels so as to enable realization of an optimum connection of the material layer to the plate. A particular advantage here is that the plate height is no longer limited to a conventional height of one meter but, by applying different point locations wherein at least some of the point locations are located at different height levels, much higher plates can be applied in the enthalpy exchanger according to the invention. One or more plates with a plate height greater than two meters can thus for instance be applied, this generally being particularly advantageous from a structural and financial viewpoint. The number of plates applied in the enthalpy exchanger can after all be at least halved in this way. The point locations generally have a relatively limited cross-section in order to prevent as far as possible obstruction of the liquid flow between the material layer and the plate. The ideal cross-section of the point locations depends on the situational conditions. The design of the (cross-section of the) point locations can also vary subject to the conditions. The point locations can herein be for instance of round, polygonal and/or elongate (for instance linear or oval) design. Furthermore, the mutual distance between the different point locations generally also depends on the specific conditions in which the enthalpy exchanger will be applied. The enthalpy exchanger according to the invention will generally be applied as indirect static cooler, in particular as dewpoint cooler, diabatic cooler and/or adiabatic cooler, in which the first liquid medium and the second medium are guided separately of each other along opposite sides of the plate. The plate will generally be manufactured here from a heat-conducting material. The plate will moreover take a substantially closed (non-perforated) form so as to be able to prevent mixing of the two media. The plate in fact functions here as separating wall. It is however also possible to envisage the enthalpy exchanger being applied as device for adding moisture or as device for removing moisture, wherein the first liquid medium and the second medium will be in contact with each other for the exchange of moisture. Depending particularly on the temperature of the first liquid medium, adding moisture to or removing moisture from the second medium can then be realized. It is noted that attaching the material layer (at multiple point locations) to the plate must be broadly interpreted; the material layer will generally be attached physically to the plate as described hereinbelow. It is however also possible to envisage the material layer being pressed against the plate at multiple point locations, for instance by means of studs and/or resilient elements with a limited pressing surface. The studs and/or resilient elements can be arranged on a strip which is pressed as such against the material layer. In this latter embodiment forces will be exerted in the direction of the plate on a side of the material layer remote from the contact side of the plate. The advantage hereof is that the number and positioning of the point locations can be modified relatively easily, for instance by displacing the strips, and can be optimized for specific situations.

In a preferred embodiment the material layer is (physically) attached to the plate at a plurality of point locations lying at a distance from each other by means of a plurality of spot welds. The material layer is attached to the plate by means of fusing at the position of the spot welds. Use can optionally be made here of a welding agent. The use of a welding agent can result in an improved, relatively durable and firm connection between the material layer and the plate. A welding agent which it is anticipated is suitable for bringing about a reliable mutual attachment of the material layer and the plate is for instance polyphenyl sulphide. In order to be able to generate multiple reliable welds points it is advantageous if the material layer and the plate are both manufactured from the same type of material, such as for instance plastic or metal. The woven fabric is preferably manufactured from a mixture of polymers so as to enable optimization of the physical properties of the woven fabric.

In another preferred embodiment the enthalpy-exchanging unit comprises attaching means to enable (physical) attachment of the material layer to the plate at a plurality of point locations lying a distance from each other. The attaching means herein function in fact as auxiliary means for the position-selective attachment of the material layer to the plate. The attaching means are more preferably formed by chemical attaching means, such as for instance glue, and/or by mechanical attaching means, such as for instance nails, screws or staples.

The point locations preferably extend over substantially the whole contact side of the plate while forming a substantially cushion-like enthalpy-exchanging surface. The cushion-like enthalpy-exchanging surface creates a plurality of flow channels via which the first medium can displace—generally as a result of the force of gravity—in downward direction. The cushion-like enthalpy-exchanging surface herein prevents air bubbles being able to form and be included in the space enclosed by the material layer and the plate.

The point locations can be arranged wholly at random. The point locations are however preferably arranged substantially in accordance with a pattern so as to enable optimization of the above stated balance between the effective utilization of the capacity on the one hand and the guarantee of an unobstructed displacement of the liquid medium on the other. The pattern, usually referred to as dot pattern, can on the other hand be of very diverse nature. The pattern can be a so-called grid pattern, matrix pattern or straight-line pattern, in which the point locations lie in horizontal and vertical line(s) relative to each other. The point locations are however preferably arranged substantially in accordance with an interstitial pattern or offset pattern, wherein the point locations only form lines in diagonal direction. In this manner the liquid medium will only be able to displace in non-linear, or at least non-vertical manner in downward direction, whereby the residence time of the liquid medium in the enthalpy-exchanging unit of the enthalpy exchanger can be increased, which generally enhances the enthalpy exchange.

During the distribution of liquid over the contact side of the plate the height of the liquid column (and thereby of the plate) and the capillary action are important factors. The liquid flow rate is preferably held substantially constant not only in horizontal direction, but preferably also in vertical direction. This is because a substantially constant flow rate enhances a uniform enthalpy transfer and ensures a minimal stratification of the temperature of the second medium leaving the enthalpy exchanger. Holding the flow rate substantially constant can be realized in different ways. The flow resistance to the first liquid medium formed by the point locations preferably increases in downward direction. An acceleration of the liquid flow resulting from the force of gravity can hereby be prevented, whereby the liquid flow rate can be held substantially constant. An increase of the flow resistance in downward direction can be caused by increasing the number of point locations in downward direction (increase in the point location density in downward direction) and/or by changing the dimensioning and/or design of the point locations in downward direction. In this latter case lower-lying point locations can for instance be given larger dimensions than point locations at a higher position.

The material layer can be manufactured from diverse materials, but preferably takes a flexible form. The material layer is preferably formed here by a woven fabric, such as for instance a cloth, in particular a fleece. The woven fabric is preferably manufactured from a durable material such as for instance a polymer, in particular polypropylene, or from wool.

The plate can take a curved form, wherein the plate can for instance form a cylinder. It is however generally advantageous from a structural (and financial) viewpoint to give the plate a substantially flat form, whereby the material layer can be connected to the plate in relatively simple and optimal manner.

As already stated in the foregoing, the enthalpy exchanger according to the invention is applied preferably, though not necessarily, as indirectly operating static cooler, in particular as dewpoint cooler, diabatic cooler and/or adiabatic cooler, wherein the plate functions in fact as separating wall along both contact sides of which the first liquid medium and the second medium respectively can displace with enthalpy exchange. In a particular preferred embodiment the separating wall forms at least one channel around which the material layer is arranged. The channel is herein adapted for passage of the second medium. The material layer is arranged against an exterior peripheral side of the channel. In this preferred embodiment the separating wall can be formed by a tube or pipe which is at least partially covered by the material layer. The separating wall can however also be embodied as a channel structure provided with a plurality of channels for passage of the second medium.

In another preferred embodiment the material layer encloses the plate on two sides. To this end the material layer can cover the plate as an endless sleeve. The advantage of having the plate enclosed by the material layer on two sides is that an increase (doubling) of the enthalpy-exchanging surface, and thereby of the capacity, of the enthalpy exchanger can be obtained. In this way the second medium can moreover also be formed in relatively simple manner by a liquid, whereby a second liquid film can be formed, which can optimize the heat transfer between the two liquids.

In order to further increase the enthalpy-exchanging capacity of the enthalpy exchanger according to the invention the enthalpy exchanger preferably comprises a plurality of enthalpy-exchanging units positioned at a distance from each other. In this way the second medium can be cooled and/or heated and/or have moisture added and/or removed in relatively rapid, intensive and efficient manner. Furthermore, the structural simplicity of the enthalpy exchanger can then be retained in relatively simple and efficient manner. For this purpose however, the enthalpy exchanger preferably comprises at least one spacer for spacing apart the enthalpy-exchanging units positioned adjacently of each other, wherein the spacer is adapted to engage simultaneously on the enthalpy-exchanging units positioned adjacently of each other. The enthalpy exchanger will however generally comprise a plurality of spacers for spacing apart the enthalpy-exchanging units positioned adjacently of each other, in order to enable positioning of the different enthalpy-exchanging units at a mutual distance in more stable manner. In a particular preferred embodiment opposite sides of at least one spacer are fixed to the respective material layers of the enthalpy-exchanging units positioned adjacently of each other, in order to further increase the stability of the enthalpy exchanger. The spacers can also be seen as pressing elements, since the spacers are also adapted to enable pressing of the material layers against the corresponding plates. It is generally advantageous to position a spacer particularly on a top side of the enthalpy exchanger in order to generate a closure for a liquid feed generally positioned above the enthalpy-exchanging units. Because the spacers are only connected to the material layer, liquid supplied via the liquid feed can trickle relatively unobstructed in downward direction between the material layer and the plate in natural (unforced) manner as a result of the force of gravity. The liquid will seep downward to the bottom of the enthalpy exchanger, where after the liquid will be discharged. Liquid that has already been used will generally not be reused, this being advantageous from a hygiene viewpoint so that micro-organisms such as for instance legionella are thus not given the chance to develop in the liquid medium. Furthermore, by omitting recirculation equipment such as for instance a pump, it will be possible to embody the enthalpy exchanger in structurally relatively simple manner, and therefore inexpensively. This principle is also referred to as static cooling.

The material layer is preferably attached to or close to one or more longitudinal edges of the plate. The longitudinal edges or narrow (peripheral) longitudinal sides of the plate generally do no contribute, or at least not essentially, toward the enthalpy exchange between the two media. These longitudinal edges or longitudinal sides can thereby be used relatively efficiently for attachment of the material layer to enable fixing of the relative orientation between the plate and the material layer, wherein an unobstructed formation and transport of the liquid film between the plate and the material layer can remain ensured.

In the manufacture of the enthalpy exchanger according to the invention the plate, which can be formed by a separating wall and/or channel plate, will generally first be covered with the hygroscopic material layer. The material layer will then generally be attached to the plate at least at a plurality of point locations lying at a distance from each other. Attachment can herein take place by applying glue (gluing) between the material layer and the plate, by spot welding of the material layer to the plate and/or by arranging mechanical attaching means such as for instance nails, screws or staples, in the material layer and in the plate. In the case the material layer is glued to the plate, it is also possible to envisage glue being applied first of all to the material layer and/or the plate, where after the material layer is pressed against the plate. Further variants and advantages of this method for manufacturing the enthalpy exchanger according to the invention have already been described at length in the foregoing.

Figure 2:
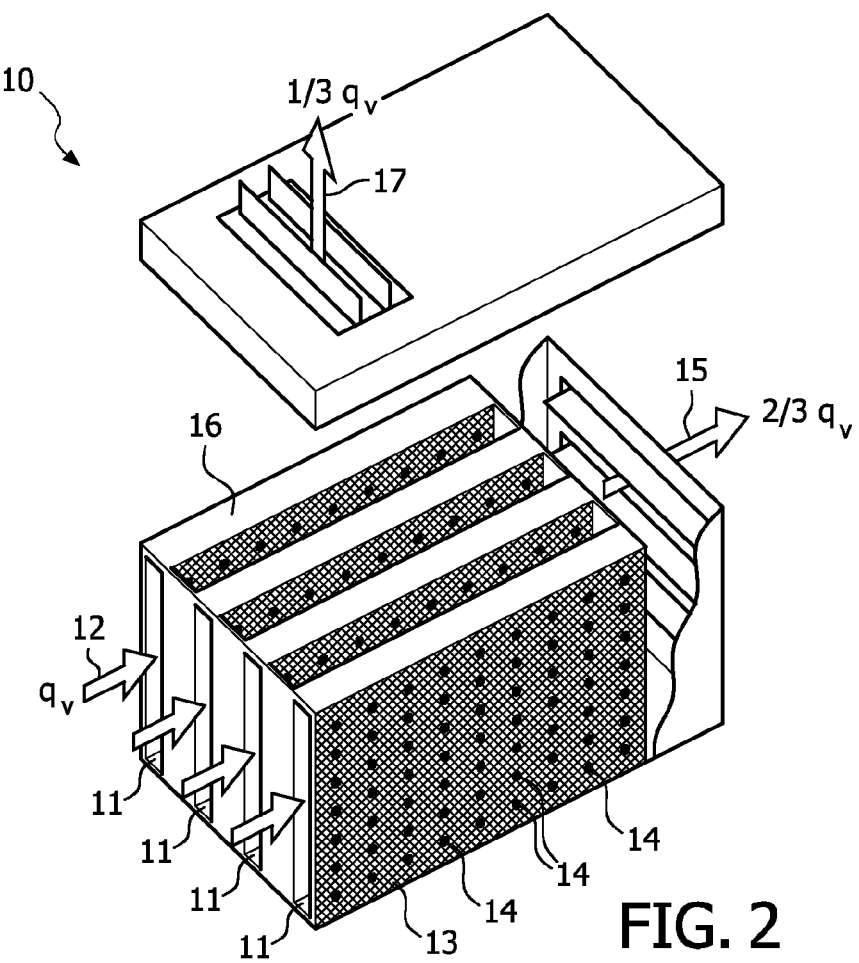
Figure 3:
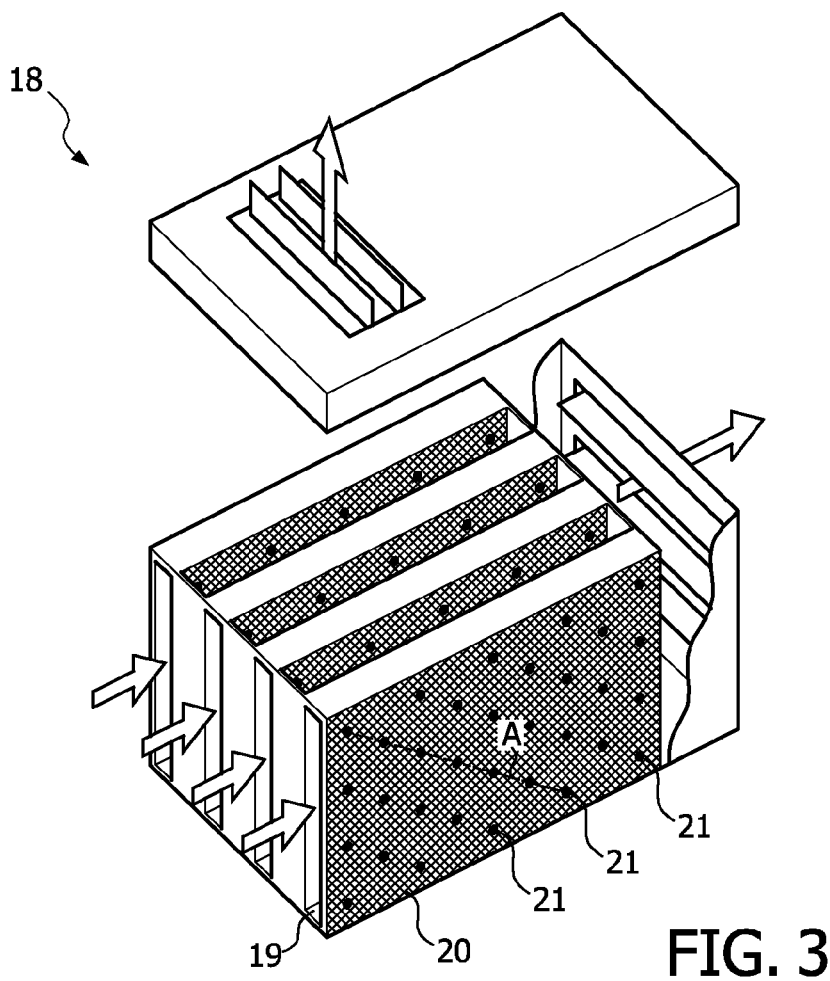
Figure 4:
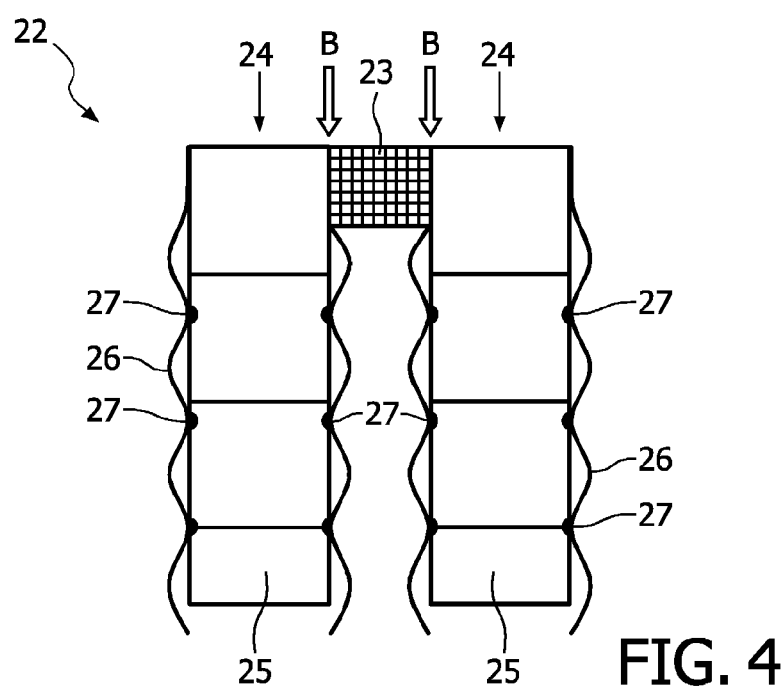
Figure 5:
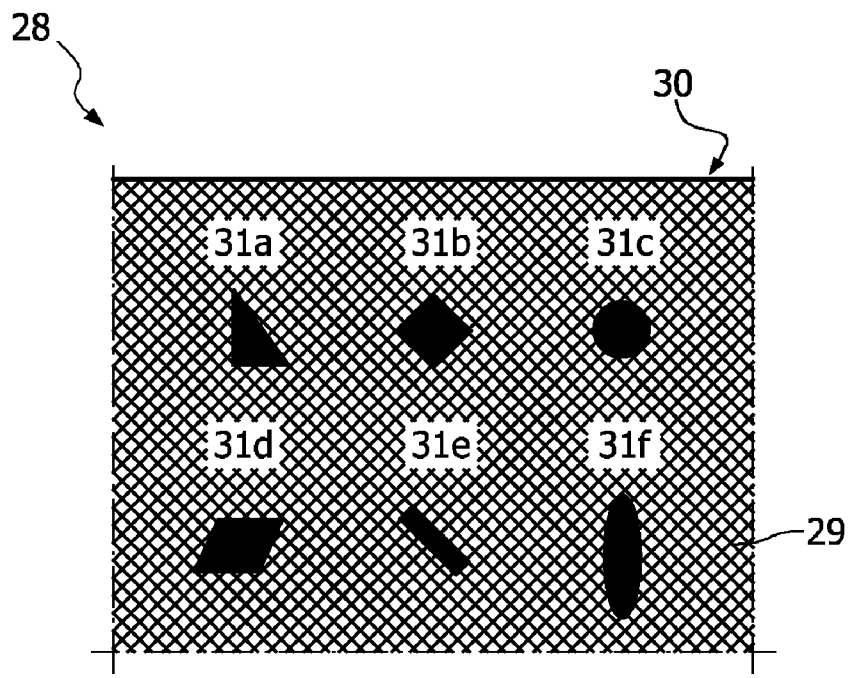
Figure 6:
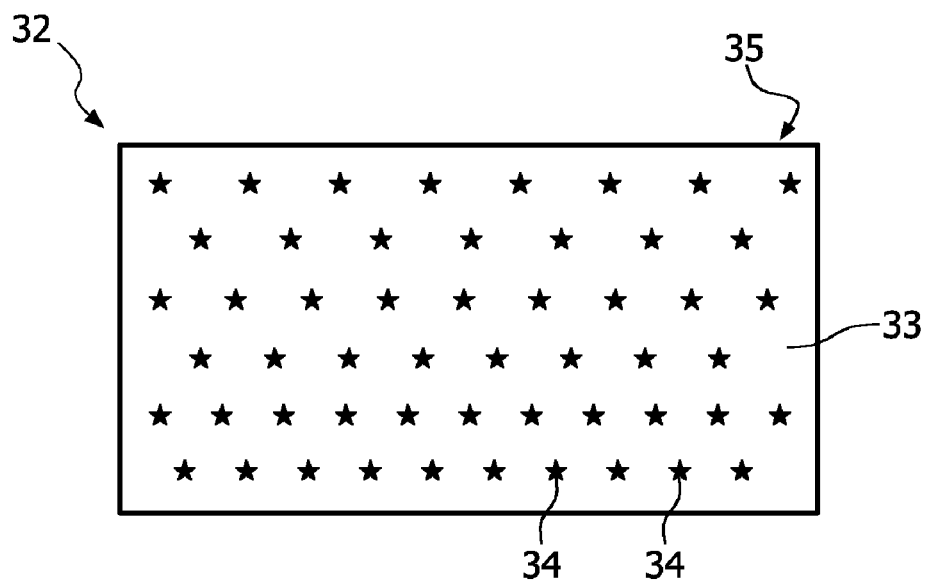

The invention will be elucidated with reference to non-limitative exemplary embodiments shown in the following figures. Herein:

FIG. 1 shows a schematic view of a dewpoint cooling process applied in an enthalpy exchanger according to the invention, FIG. 2 shows a perspective view of a first embodiment of an enthalpy exchanger according to the invention, FIG. 3 is a perspective view of a second embodiment of an enthalpy exchanger according to the invention, FIG. 4 shows a cross-section of the enthalpy exchanger of FIG. 3, FIG. 5 shows a detail view of a part of an enthalpy exchanger according to the invention, and FIG. 6 shows another detail view of a part of an enthalpy exchanger according to the invention.

FIG. 1 shows a schematic view of a dewpoint cooling process 1 applied in an enthalpy exchanger 2 according to the invention. The dewpoint cooling process 1 is already known as such from the prior art. A relatively warm airflow 3 of about 28° C. with a relative humidity of 50% is fed to enthalpy exchanger 2. Separately of airflow 3 a correct quantity of water 4 is also guided into enthalpy exchanger 2 to enable indirect cooling, via a separating wall (not shown), of the relatively warm airflow 3. The separating wall is herein covered on one side by a cover layer between which a film layer will form through adhesion of the water 4 in order to optimize heat transfer. After airflow 3 has passed through exchanger 2, a large part of the cooled airflow 5 is guided out of exchanger 2 at a temperature of about 18.5° C. and can further be used efficiently as conditioned air for air-conditioning or industrial cooling. A fraction of the cooled airflow 6 will be fed back into exchanger 2 in order to absorb and thus discharge the evaporated moisture from enthalpy exchanger 2 as relatively warm process flow 7. Excess water can be removed from exchanger 2 via a drainage flow 8. Electricity 9 must also be fed to exchanger 2 in order to enable airflow 3 to be actively guided through exchanger 2.

FIG. 2 is a perspective view of a first embodiment of an enthalpy exchanger 10 according to the invention, usually also referred to as heat exchanger. Enthalpy exchanger 10 functions in accordance with the dewpoint cooling process 1 as shown in FIG. 1. Exchanger 10 comprises a plurality of channeled separating walls 11 for passage of an airflow 12 for cooling. An outer side of each separating wall 11 is covered on two sides with a hygroscopic cover layer 13. In order to allow permanent connection of cover layer 13 to separating wall 11, cover layer 13 is connected to separating wall 11 at a plurality of point locations 14 lying at a distance from each other. Point locations 14 can be formed by for instance spot welds, gluing points and/or by mechanical fixing elements such as for instance tacks, nails, screws, clamps or staples. As shown, point locations 14 have a regular arrangement in a grid pattern, wherein point locations 14 in fact form mutually horizontal and vertical lines. Between point locations 14 the cover layer 13 only lies against separating wall 11 and is not attached to separating wall 11. A liquid film can thereby form in relatively unobstructed manner between cover layer 13 and separating wall 11, which film can extend over practically the whole surface of separating wall 11 directed toward cover layer 13 in order to enable optimization of the heat transfer between airflow 12 and the liquid. In addition, point locations 14 generate sufficient adhesion between separating wall 11 and cover layer 13 so as to be able to prevent air (bubble) formation between separating wall 11 and cover layer 13, whereby the heat transfer can be further optimized. FIG. 2 also shows that a fraction 16 of the cooled airflow 15 is fed back along cover layer 13. The air is herein guided along the evaporated liquid to enable an efficient absorption of this evaporated liquid to take place, wherein the moistened air can be removed from the exchanger as warm process flow 17.

FIG. 3 shows a perspective view of a second embodiment of an enthalpy exchanger 18 according to the invention. The enthalpy exchanger 18 according to this figure has a strong structural resemblance to enthalpy exchanger 2 shown in FIG. 2, wherein enthalpy exchanger 18 also comprises a plurality of separating walls 19 and a cover layer 20 arranged round each separating wall 19, wherein cover layer 20 is connected to separating wall 19 at a plurality of point locations 21 lying at a distance from each other, with the difference however that in this exemplary embodiment point locations 21 are arranged in an alternating pattern, usually also referred to as an interstitial pattern or staggered (offset) pattern. Point locations 21 are herein arranged in diagonal lines A. The alternating pattern of point locations 21 is generally preferred to a matrix pattern as shown in FIG. 2, since liquid present between separating wall 19 and cover layer 20 cannot displace in a linear movement, but only in a non-linear movement in downward direction, which increases the residence time of the liquid in enthalpy exchanger 18, whereby the enthalpy-exchanging capacity and the efficiency of enthalpy exchanger 18 can be improved.

FIG. 4 shows a cross-section of enthalpy exchanger 22 of FIG. 3. Enthalpy exchanger 22 comprises a plurality of enthalpy-exchanging units 24 spaced apart by a spacing strip 23. Each enthalpy-exchanging unit 24 comprises a hollow, heat-conducting channel plate 25 around which a hygroscopic cloth 26 is arranged. A substantially gaseous medium for cooling is guided through channel plate 25. Cloth 26 is moistened by means of supplying water to cloth 26 at the position of spacing strip 23 (see arrows B). Since spacing strip 23 is only attached to cloth 26 (and so not (directly) to channel plate 25), relatively simple and substantially unobstructed moistening of the cloth can take place. The liquid supplied to cloth 26 will be situated partly in a space present between cloth 26 and channel plate 25 where a liquid film (not shown) will form. The liquid film will then extract heat from the gaseous flow being guided through channel plate 25, whereby the gaseous flow is cooled. Cloth 26 is attached as cushion to channel plate 25 at a plurality of point locations 27, for instance by means of welding, gluing and stapling, this being somewhat exaggerated in the figure. In this way a good permanent connection of cloth 26 to channel plate 25 can be realized on the one hand, wherein undesirable air (bubble) formation between cloth 26 and channel plate 25 can be prevented, and wherein liquid situated between cloth 26 and channel plate 25 can on the other hand displace substantially unobstructed in downward direction as a result of the force of gravity. It is noted that a plurality of spacing strips 23 will generally be applied one below another and at a distance from each other to enable stabilizing of enthalpy exchanger 22. Due to the considerable number of attachment points 26 that are present, the number of spacing strips 23 arranged between two adjacent enthalpy-exchanging units 24 can in general remain limited to two to four strips 23. However, in order to provide a simplified view of enthalpy exchanger 22 the other spacing strips 23 are here omitted.

FIG. 5 shows a detail view of a part of an enthalpy exchanger 28 according to the invention. In the shown detail view only a hygroscopic fleece 29 is shown behind which a plate 30 is positioned. Fleece 29 is attached at different point locations 31a-31f to plate 30, for instance by means of spot welds. As shown (simplistically), the dimensioning and design of point locations 31a-31f can differ from each other. The mutual distance between point locations 31a-31f can also vary and depends on the specific application of enthalpy exchanger 28. The operation of enthalpy exchanger 28 and the advantages of attaching fleece 29 to plate 30 at different point locations 31a-31f have already been described at length in the foregoing.

FIG. 6 shows another detail view of an enthalpy exchanger 32 according to the invention. In the detail view shown here there is again only shown a hygroscopic fleece 33 behind which a heat-conducting plate 35 is positioned. Fleece 33 is pressed at different point locations 34 against plate 35, for instance by means of resilient studs. This figure shows clearly that the point location density increases in downward direction, whereby the flow resistance formed by point locations 34 to a liquid flowing in downward direction between the plate and fleece 33 also increases in downward direction. In this way the liquid flow rate of the liquid can be held substantially constant in vertical direction, whereby a relatively uniform enthalpy exchange can be realized.

It will be apparent that the invention is not limited to the exemplary embodiments shown and described here, but that within the scope of the appended claims numerous variants are possible which will be self-evident to the skilled person in the field.

The following claims are presented for examination:

1. Enthalpy exchanger, comprising at least one enthalpy-exchanging unit, which enthalpy-exchanging unit:

comprises at least one plate, along at least one contact side of which a first liquid medium and a second medium can be displaced while exchanging enthalpy, and comprises at least one hygroscopic material layer which connects to at least one contact side of the plate in contact with the first liquid medium, wherein the mutual orientation of the plate and the material layer is such that a liquid film of the first medium can form between the plate and the material layer, wherein the liquid film is in enthalpy-exchanging contact with both the plate and the material layer, characterized in that the material layer is attached to the plate at a plurality of point locations lying a distance from each other such that the liquid film can extend substantially unobstructed over substantially the whole contact side of the separating wall.

2. Enthalpy exchanger as claimed in claim 1, characterized in that the material layer is attached to the plate at a plurality of point locations lying at a distance from each other by means of a plurality of spot welds.

3. Enthalpy exchanger as claimed in claim 1, characterized in that the material layer and the plate are both manufactured from the same type of material.

4. Enthalpy exchanger as claimed in claim 1, characterized in that the enthalpy-exchanging unit further comprises attaching means for physical attachment of the material layer to the plate at a plurality of point locations lying a distance from each other.

5. Enthalpy exchanger as claimed in claim 4, characterized in that the attaching means are formed by chemical attaching means and/or by mechanical attaching means.

6. Enthalpy exchanger as claimed in claim 1, characterized in that the point locations extend over substantially the whole contact side of the plate while forming a substantially cushion-like enthalpy-exchanging surface.

7. Enthalpy exchanger as claimed in claim 1, characterized in that the point locations are arranged substantially in accordance with a pattern.

8. Enthalpy exchanger as claimed in claim 7, characterized in that the point locations are arranged substantially in accordance with an offset pattern, wherein the point locations form lines substantially only in diagonal direction.

9. Enthalpy exchanger as claimed in claim 1, characterized in that the flow resistance to the first liquid medium formed by the point locations increases in downward direction.

10. Enthalpy exchanger as claimed in claim 1, characterized in that the material layer is substantially flexible.

11. Enthalpy exchanger as claimed in claim 1, characterized in that the material layer is formed by a woven fabric.

12. Enthalpy exchanger as claimed in claim 1, characterized in that the plate takes a substantially flat form.

13. Enthalpy exchanger as claimed in claim 1, characterized in that the plate forms a heat-conducting separating wall along both contact sides of which the first liquid medium and the second medium respectively can displace with enthalpy exchange.

14. Enthalpy exchanger as claimed in claim 1, characterized in that the material layer encloses the plate on two sides.

15. Enthalpy exchanger as claimed in claim 1, characterized in that the plate forms at least one channel for passage of the second medium, around which channel the material layer is arranged.

16. Enthalpy exchanger as claimed in claim 1, characterized in that the enthalpy exchanger comprises a plurality of enthalpy-exchanging units positioned at a distance from each other.

17. Enthalpy exchanger as claimed in claim 16, characterized in that the enthalpy exchanger comprises at least one spacer for spacing apart the enthalpy-exchanging units positioned adjacently of each other, wherein the spacer is adapted to engage simultaneously on the enthalpy-exchanging units positioned adjacently of each other.

18. Enthalpy exchanger as claimed in claim 17, characterized in that the enthalpy exchanger comprises a plurality of spacers for spacing apart the enthalpy-exchanging units positioned adjacently of each other.

19. Enthalpy exchanger as claimed in claim 17, characterized in that opposite sides of at least one spacer are fixed to the respective material layers of the enthalpy-exchanging units positioned adjacently of each other.

20. Enthalpy exchanger as claimed in claim 1, characterized in that the material layer is physically attached to or at least close to one or more longitudinal edges of the separating wall.

* * * * *